Oct. 31, 1939.                A. RÜTTENAUER                2,178,436
                      GASEOUS ELECTRIC DISCHARGE DEVICE
                              Filed Jan. 12, 1939
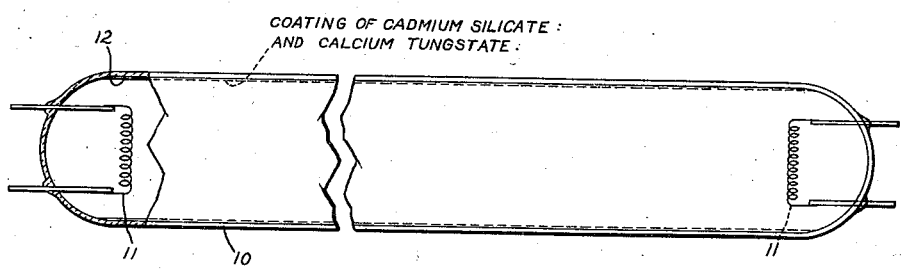
                                              Inventor:
                                          Alfred Ruttenauer,
                                       by Harry E. Dunham
                                              His Attorney.

Patented Oct. 31, 1939

2,178,436

UNITED STATES PATENT OFFICE 2,178,436

GASEOUS ELECTRIC DISCHARGE DEVICE

Alfred Rüttenauer, Berlin-Halensee, Germany, assignor to General Electric Company, a corporation of New York Application January 12, 1939, Serial No. 250,648
In Germany February 2, 1938

6 Claims. (Cl. 176—122)

My invention relates to gaseous electric discharge devices generally, and more particularly to such devices provided with a layer of luminescent material which is excited to luminescence by the electrical discharge.

In the German patent, No. 646,716, an electric discharge tube or luminous tube with mercury-vapor filling has been described, which is internally provided with a luminophor or luminescent layer consisting of a cadmium silicate activated by means of manganese, the current density of the discharge ranging between 100 and 500 ma. per sq. cm. Inasmuch as the cadmium silicate does not adhere well to the glass wall of the lamp or tube envelope, even when a binder layer of phosphoric acid has been applied previously on the glass wall, it was necessary in practice up to the present to add to the cadmium silicate 20 to 35 per cent of zinc oxide, which constitutes a sintering medium acting as cement. Inasmuch as zinc oxide does not luminesce, this practice entails a loss in light.

This loss in luminosity is avoided if, according to the present invention, there is added to the cadmium silicate which has been activated by means of manganese, a calcium tungstate which has been activated by means of samarium. The quantity of samarium which is introduced into the calcium tungstate as activator may amount to about 0.1 to 1 per cent. The calcium tungstate which has been activated by means of samarium, and which is added to the cadmium silicate, acts not only similarly to zinc oxide as a sintering medium for the cadmium silicate, but it acts also as a source of illumination since the mercury radiation stimulates its luminescence. As a result, the total light output of the discharge lamp or luminous tube is increased. A special advantage lies in the fact that the luminescent light of the calcium tungstate activated by means of samarium has an orange color, just as that of cadmium silicate. Because of this, the hue of the total radiation made up of the mercury radiation and luminescent radiation will not be changed.

If the discharge lamp or luminous tube is equipped, in the usual manner, with a clear glass envelope, the following result is obtained: With a current density of the discharge ranging between 100 and 500 ma. per sq. cm., the mixture of the orange-hued luminescent radiation with the blue-green mercury radiation will give a total radiation of approximately daylight aspect. However, if a lamp envelope consisting of yellow glass is used, or a yellow-glass jacket which surrounds the lamp envelope, or if the lamp envelope or the jacket is provide with a yellow lacquer or dye or glass top-layer or base-layer, the filtering of the green and blue mercury rays will give a golden-yellow light, even when a lower current density than 100 ma. per sq. cm. is used. The reason for this is that at lower current densities the luminescent radiation which contains much red manifests itself more pronouncedly than the mercury radiation.

For a further understanding of the invention, reference may be had to the drawing which is an elevation of one type of lamp in which my invention may be employed.

The lamp illustrated in the drawing comprises a tubular glass container or envelope 10 having sealed into each end thereof an electrode 11 which may be a thermionic cathode or a cold cathode as is well known in the art. The envelope 10 contains a gaseous atmosphere which emits ultra-violet radiations upon passage of a discharge therethrough, preferably an atmosphere of mercury vapor together with a low pressure of a gas such as argon. Preferably the inner surface of the envelope 10 is coated with a layer 12 of manganese-activated cadmium silicate and samarium-activated calcium tungstate in accordance with my invention. With a current density of between 100 and 500 ma. per sq. cm. in the discharge, the lamp will emit light of approximately daylight hue. However, a golden-yellow light may be obtained by the use of a yellow filter, which may be provided by making the envelope 10 of yellow glass, or by surrounding a clear envelope 10 with a yellow glass jacket or tube, or by providing the envelope 10 or a clear glass jacket with a layer of yellow lacquer.

What I claim as new and desire to secure by Letters Patent of the United States:

1. A gaseous electric discharge lamp device comprising a container, a gaseous atmosphere in said container capable of emitting ultra-violet radiations upon passage of an electrical discharge therethrough and a coating of luminescent material in said container consisting of manganese-activated cadmium silicate and samarium-activated calcium tungstate.

2. A gaseous electric discharge lamp device comprising a container, a gaseous atmosphere in said container capable of emitting ultra-violet radiations upon passage of an electrical discharge therethrough and a coating of luminescent material in said container consisting of manganese-activated cadmium silicate and about 20 to 35 per cent of samarium-activated calcium tungstate.

3. A gaseous electric discharge lamp device comprising a container, a yellow filter associated with said container, a gaseous atmosphere in said container capable of emitting ultra-violet radiations upon passage of an electrical discharge therethrough and a coating of luminescent material in said container consisting of manganese-activated cadmium silicate and samarium-activated calcium tungstate.

4. A gaseous electric discharge lamp device comprising a container, a gaseous atmosphere in said container comprising mercury vapor capable of emitting ultra-violet radiations upon passage of an electrical discharge therethrough and a coating of luminescent material in said container consisting of manganese-activated cadmium silicate and samarium-activated calcium tungstate.

5. A gaseous electric discharge lamp device comprising a container, a gaseous atmosphere in said container comprising mercury vapor capable of emitting ultra-violet radiations upon passage of an electrical discharge therethrough and a coating of luminescent material in said container consisting of manganese-activated cadmium silicate and about 20 to 35 per cent of samarium-activated calcium tungstate.

6. A gaseous electric discharge lamp device comprising a container, a yellow filter associated with said container, a gaseous atmosphere in said continer comprising mercury vapor capable of emitting ultra-violet radiations upon passage of an electrical discharge therethrough and a coating of luminescent material in said container consisting of manganese-activated cadmium silicate and samarium-activated calcium tungstate.

ALFRED RÜTTENAUER.